Sept. 19, 1933.  E. M. LONG  1,927,552
SURFACE GRINDER
Filed Nov. 30, 1931    6 Sheets—Sheet 1

INVENTOR
E. M. Long
BY
Denison & Thompson
ATTORNEYS

WITNESS
J. J. Mains

Sept. 19, 1933.　　　　E. M. LONG　　　　1,927,552
SURFACE GRINDER
Filed Nov. 30, 1931　　　6 Sheets-Sheet 4

Sept. 19, 1933.  E. M. LONG  1,927,552
SURFACE GRINDER
Filed Nov. 30, 1931    6 Sheets-Sheet 6

INVENTOR
E. M. Long
BY
Denison & Thompson
ATTORNEYS

WITNESS
J. J. Mains

Patented Sept. 19, 1933

1,927,552

UNITED STATES PATENT OFFICE 1,927,552

SURFACE GRINDER

Eli Maynard Long, Geneva, N. Y., assignor to Shuron Optical Company, Inc., Geneva, N. Y., a corporation of New York Application November 30, 1931
Serial No. 578,023

20 Claims. (Cl. 51—58)

This invention relates to a machine for grinding the surfaces of lenses and analogous objects and is adapted to be used more particularly for grinding curved surfaces of widely varying radii such, for example, as the surfaces of toric lenses and others having more or less complex curvatures determined by the contour of the lap.

The main object is to provide simple and efficient means for automatically effecting a compound relative traversing movement of the lens and lap in different and continuously changing paths along and across both axes of the lens so that it never reaches the limit of its travel on the lap at the same spot twice in succession, thus eliminating the need of the so-called third motion.

One of specific objects is to mount the workholder upon a semi-floating carrier and to reciprocate said carrier in such manner as to cause the work to continually travel in changing paths from a straight line in one meridian through constantly varying ellipses about that meridian to a straight line in another meridian at right angles to the first meridian, and thence through different constantly changing ellipses about the second meridian and return along the first meridian, thus completing a cycle of operation which may be repeated through further changing ellipses until the surface of the work is brought to the required contour and finish.

Another object is to mount the lens-holder upon the intermediate portion of a yoke or saddle having its opposite ends engaged with suitable fulcra on the semi-floating carrier in such manner that the line of pressure of the fulcra on the yoke for holding the work against the lap will be in approximately the plane of the surface being ground.

A further object is to provide simple means, under the control of the operator, for changing the stroke or amount of reciprocal movement of the work-supporting carrier from maximum to minimum and vice versa while the machine is in operation.

Another object is to provide means, operable at will, for stopping the machine and for simultaneously lifting the work-supporting carrier from the lap to permit the free application of the abrasive material to the lap or to the surface of the lens or for any other desired purpose.

Other objects and uses relating to specific parts of the machine will be brought out in the following description.

Figure 1:
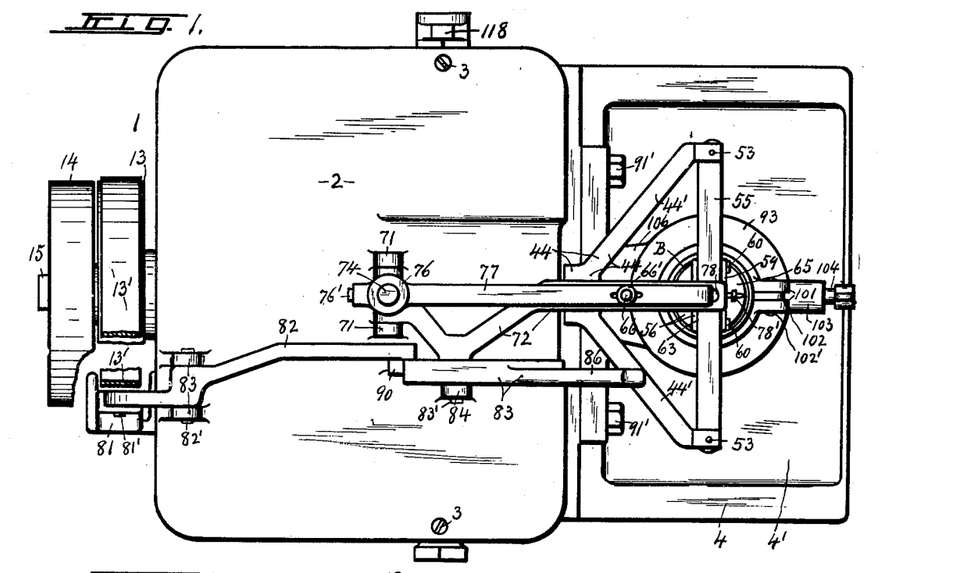
Figure 1 is a top plan of a surface grinding machine embodying the various features of my invention, the belt being partly broken away and partly in section.
Figure 2:
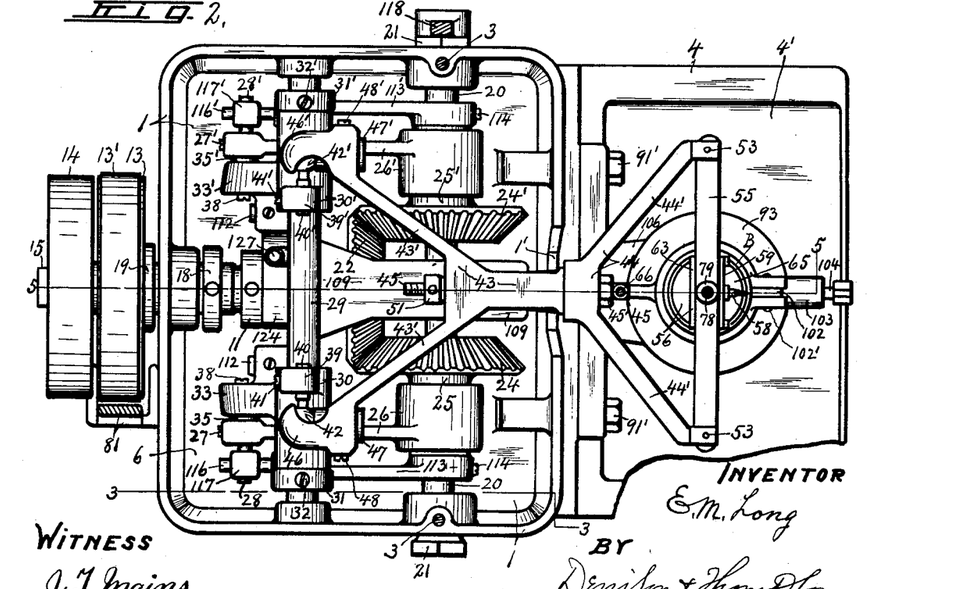
Figure 2 is a top plan of the same machine with the cover removed to show the interior mechanism.

As illustrated, this machine comprises an upright gear case or housing —1— having a removable top or cover —2— adapted to be secured thereto by screws —3— or equivalent fastening means, Figures 1 and 2, and constituting the main supporting frame.

The lower front wall of the housing —1— is provided with a forwardly projecting shelf —4— having its upper side chambered at —4'— for the reception of a pair or tray to catch the waste abrasive.

Figure 5:
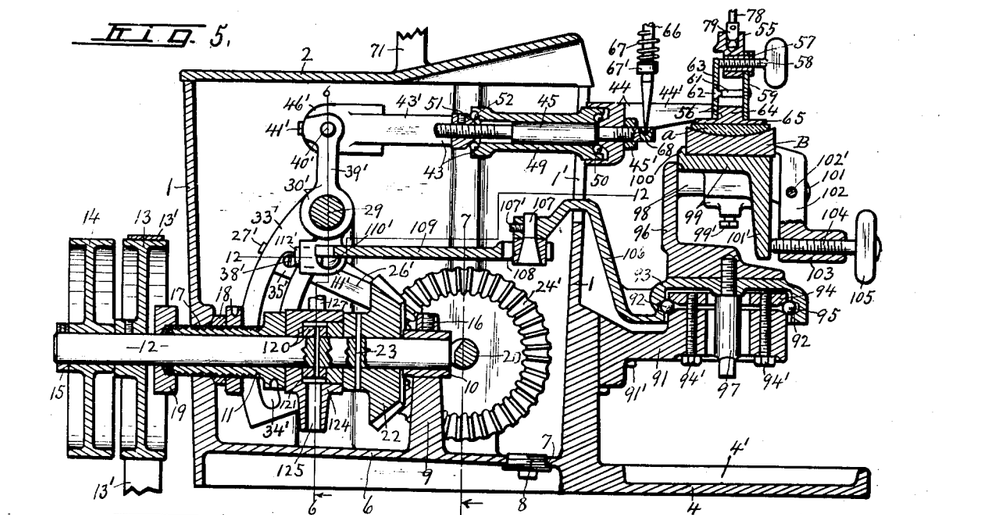
Figure 5 is a longitudinal vertical sectional view taken along line 5—5, Figure 2.

The gear case or housing —1— is provided with a normally closed bottom wall —6— to enable it to retain a quantity of oil for lubrication purposes and is preferably inclined downwardly from the rear toward the front and is provided at its lower point with an outlet —7— normally closed by a plug —8—, which, when removed, permits the oil to be drained from the interior of the housing when desired, it being understood that fresh oil may be supplied to the interior of the housing from the top when the lid or cover —2— is removed or through one or more openings through which certain movable parts operate above the normal level of the oil, see Figure 5.

The bottom wall —6— of the gear case is provided intermediate its ends with an upwardly projecting post —9— which, together with the rear upright wall of the housing, are provided with bushings or axially spaced co-axial bearings —10— and —11— for receiving and supporting a horizontal driving shaft —12— shown more clearly in Figures 5 to 8 inclusive.

The driving shaft —12— extends to the exterior of the rear wall of the housing —1— and is provided with a tight pulley —13— and a loose pulley —14—, the latter being held against endwise displacement from the shaft by a collar —15— as shown more clearly in Figure 5.

The inner shaft bearing —10— is secured in a corresponding opening in the post —9— by means of a set screw —16— while the outer bushing —11— extends through an opening —17— in the rear walls of the housing —1— and is preferably threaded and engaged by inner nuts —18— to hold it against outward movement, the outer end being engaged by a gland nut —19— to prevent leakage of oil along the shaft —12— from the interior to the exterior of the housing.

Lens holder operating means

A cross shaft —20— (Figures 2, 3, 5, 7, 8 and 9) is journaled in gland bearings —21— in opposite sides of the gear case —1— in the same horizontal plane as and across the inner end of the driving shaft —12— for limited angular movement about its axis for a purpose hereinafter described.

The driving shaft —12— is provided near its inner end with a bevel gear —22— which is secured thereto by a pin —23— or equivalent fastening means to rotate therewith.

A pair of bevel gears —24— and —24'— are loosely mounted upon the cross shaft —20— at opposite sides of the driving shaft —12— to mesh with the driving gear or pinion —22— for receiving rotary motion therefrom and, of course, will be driven in opposite directions by reason of their engagement with opposite sides of the pinion, said gears —24— and —24'— being of different diametral pitch in that they are provided with unequal numbers of teeth for slightly differentiating their speeds of rotation for a purpose hereinafter explained.

Figure 8:
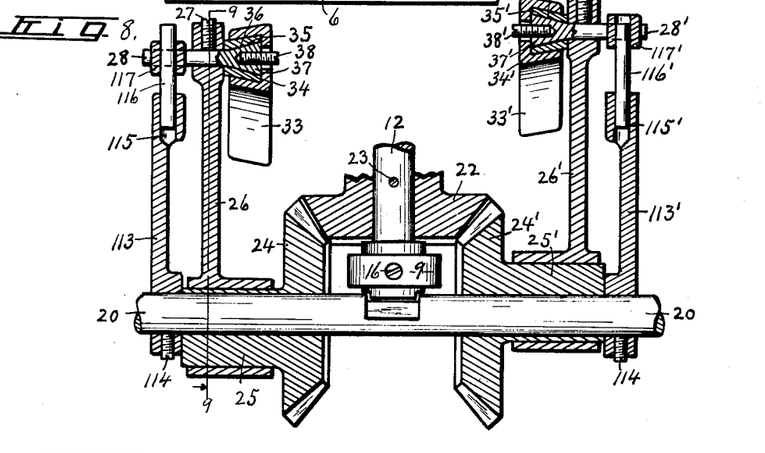
Figure 8 is an enlarged horizontal detail sectional view taken along the line 8—8, Figure 3.

These gears —24— and —24'— are provided with similar hubs —25— and —25'— having eccentric peripheral bearing faces for receiving and supporting the adjacent ends of a pair of pitman rods or bars —26— and —26'— which extend rearwardly from their respective hubs and have their rear ends secured respectively by set screws —27— and —27'— to yoke pins —28— and —28'— which are parallel with the axis of the shaft —20— as shown more clearly in Figure 8.

Figure 7:
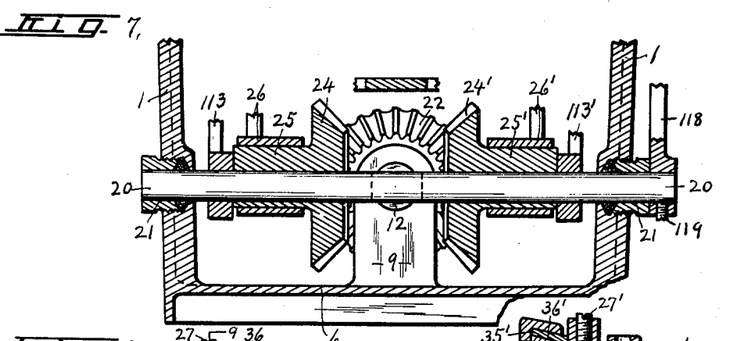
Figure 7 is a detail vertical sectional view taken in the plane of line 7—7, Figure 5.
Figure 9:
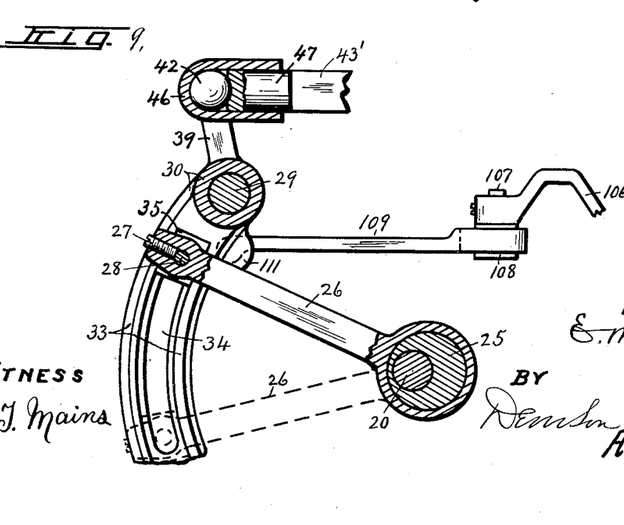
Figure 9 is a detail sectional view taken in the plane of line 9—9, Figure 8.

That is, the front ends of the pitmen or connecting rods —26— are journaled upon the eccentric peripheries of their respective hubs —25— and —25'— of the corresponding gears —24— and —24'— as shown more clearly in Figures 7, 8 and 9.

Figure 6:
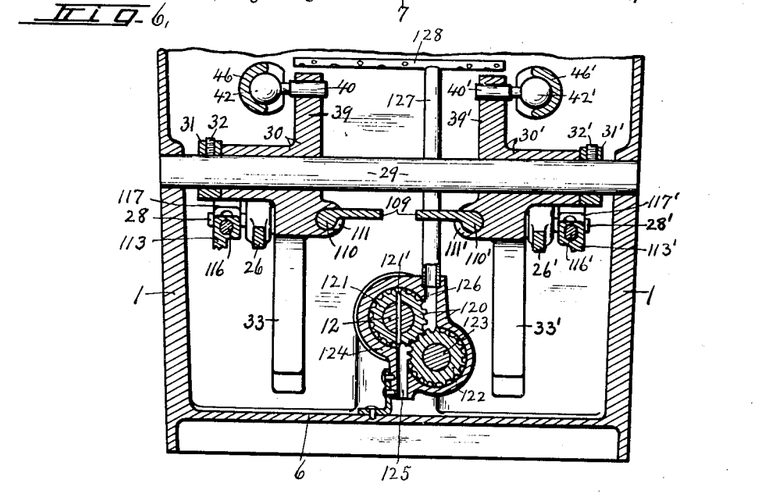
Figure 6 is a transverse vertical sectional view taken along the line 6—6, Figure 5, the upper portion of the gear case being broken away.

An additional cross shaft —29— is supported in the opposite side walls of the gear case —1— for receiving and supporting a pair of axially spaced members —30— and —30'— which are loosely mounted upon said shaft for independent and relative rocking movement about the axis thereof, see Fig. 6.

These members —30— and —30'— are held against outward movement along the shaft —29— by collars —31— and —31'— which engage the outer ends of the hubs of said members and are secured to said shaft by set screws —32— and —32'— respectively.

The members —30— and —30'— are provided respectively with pendant crank arms —33— and —33'— having lengthwise slots —34— and —34'— preferably of dove-tailed cross section for receiving a pair of crossheads —35— and —35'— which are mounted on the inner ends of the corresponding pins —28— and —28'— and are slidable lengthwise of and within their respective grooves —34— and —34'—, see Figures 2, 3, 8 and 9.

The inner and outer faces of the crossheads —35— and —35'— are tapered to conform to the corresponding walls of the dove-tailed grooves —34— and —34'—, said cross-heads being provided with outwardly tapered sockets —36— and —36'— for receiving correspondingly tapered heads —37— and —37'— of the adjacent yoke pins —28— and —28'—, see Figure 8.

The heads —37— and —37'— are also provided with sockets for receiving stop screws —38— and —38'— which are adapted to engage the lower end wall of the slots —34— and —34'— to prevent downward displacement of the cross-heads —35— and —35'— from the lower ends of their respective crank-arms —33— and —33'—.

It is now clear that the yoke pins —28— and —28'— and their respective cross-heads —35— and —35'— constitute connections between the corresponding pitmen —26— and —26'— and crank arms —33— and —33'— so that as each pitman is reciprocated endwise by the rotation of its corresponding eccentric —25—, such reciprocal motion will be transmitted to the corresponding crank arms —33— and —33'— for rocking the adjacent members —30— or —30'— about the axis of the shaft —29— relatively to each other.

The oscillating members —30— and —30'— are provided respectively with upwardly projecting crank arms —39— and —39'— having apertures for receiving a pair of similar bearing pins —40— and —40'— which are arranged equal distances from and parallel with the axis of the shaft —29— and are secured in operative position by set screws —41— and —41'— to extend outwardly from their respective crank arms —39— and —39'—, the outer ends of said bearing pins being provided with spherical bearings —42— and —42'— as shown more clearly in Figures 2, 6, 10 and 11.

Carrier frame for the lens holder

The carrier frame for the lens holder comprises, in this instance, two Y-shaped sections —43— and —44— arranged in a substantially horizontal plane above the shaft —29— to extend forwardly and rearwardly of the machine and having their stems pivotally connected end to end by means of a pivotal bolt —45— as shown more clearly in Figure 5, the section —43— having its branches —43'— diverging rearwardly and provided at their rear ends with socketed terminals —46— and —46'— engaged respectively with the spherical members —42— and —42'— on the pins —40— and —40'— as shown in Figures 2, 6, 9, 10 and 11.

Figure 10:
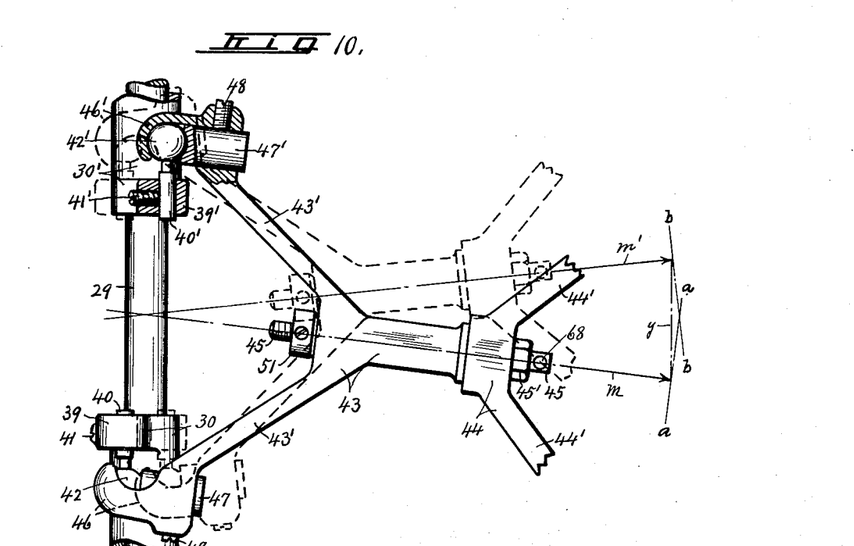
Figure 10 is a detail horizontal sectional view taken on line 10—10, Figure 3, except that one of the knuckle joints between the work-supporting carrier and upper end of one of the rocker arms is shown in top plan, the dotted lines indicating a different position of the carrier from that shown in full lines.
Figure 11:
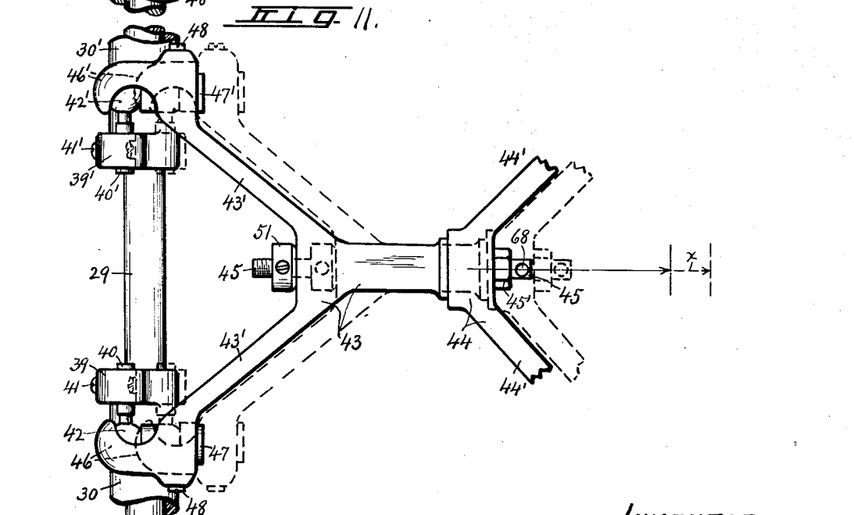
Figure 11 is a top plan of the parts shown in Figure 10 in which the dotted lines indicate a different position of the work-supporting carrier from that shown by full lines.

The socketed terminals —46— and —46'— are held in engagement with their respective spherical members —42— and —42'— by adjustable bearings —47— and —47'— which, in turn, are secured in their adjusted positions by set screws —48— shown more clearly in Figures 9, 10 and 11.

The stem of the section —43— is relatively longer than that of the section —44— and is provided with a central lengthwise opening —49— in which the pivotal pin or spindle —45— is journaled for relative rotation therein, Figure 5.

The central hub or stem of the section —44— is mounted upon the front end of the spindle —45— and is secured thereto by a lock nut —45'— to permit said section —44— to rock about the axis of the spindle relatively to the section —43— for a purpose hereinafter described, the adjacent ends of the section —43— and —44— being engaged by anti-friction end thrust bearings —50— as shown in Figure 5.

The rear end of the spindle —45— is threaded and engaged by a nut —51— which bears against the adjacent end of the stem of the section —43— through the medium of anti-friction end thrust bearings —52—, the nut —51— being held in its adjusted position by a suitable set screw, as shown in Figure 5.

The anti-friction bearings —50— and —52— serve to hold the sections —43— and —44— against relative endwise movement while permitting free relative angular movement thereof about the axis of the spindle for a purpose hereinafter explained.

Figures 13, 14:
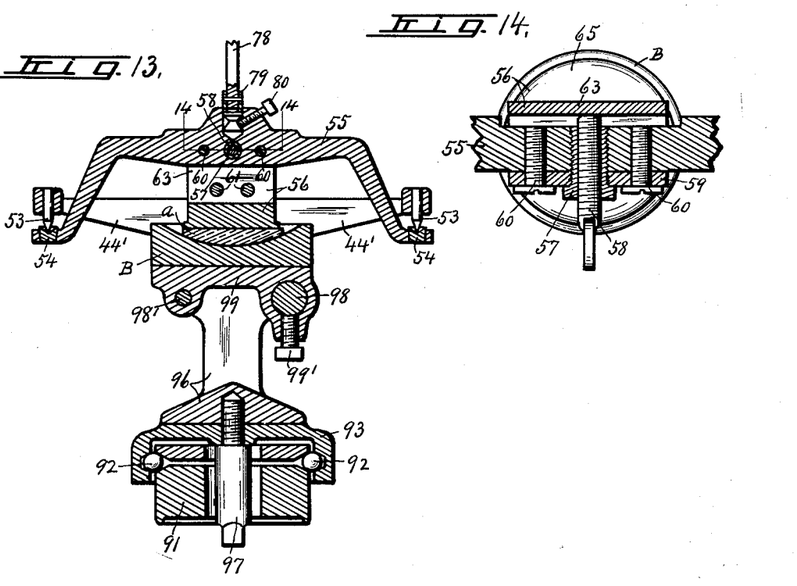
Figure 13 is an enlarged transverse sectional view taken on line 13—13, Figure 3.
Figure 14 is a further enlarged detail sectional view taken in the plane of line 14—14, Figure 13.

The section —44— is provided with forwardly diverging branch arms —44'— having their forward ends provided with downwardly projecting pointed pins —53— adapted to engage underlying hardened bearings —54— on the opposite ends of a saddle member —55— which, in turn, is adapted to receive and support a lens holder —56— carrying the lens —a— or other work, the surface of which is to be ground, see Figure 13.

The bearing members —54— are tightly secured in the opposite ends of the saddle member —55— and are provided with conical sockets in their upper faces for receiving the lower pointed ends of the pins —53— which engage the sockets in about the horizontal plane of engagement of the lens —a— with the lap —B—, as shown more clearly in Figures 1, 2, 3, 5 and 13, to assure the retention of the lens-holder substantially normal to the surface of the lap and thereby to prevent displacement of the lens from the lap particularly when the grinding surface is of relatively short radius.

It will be noted that the central portion of the saddle extends across and some distance above the upper surface of the lap —B— and that the opposite ends of the saddle extend downwardly in diverging planes some distance beyond opposite sides of said lap and below the adjacent ends of the branches —44'— of the frame section —44— to receive the bearing pins —53— and to allow free lateral rocking movement of the saddle and its supporting section —44— without liability of contact with the lap or its supporting means, see Figures 1, 2, 3 and 13.

The lens-holder —56— comprises an externally and internally threaded bushing —57— tightly screwed into a central opening in the saddle —55— for receiving a thumb screw —58— which, in turn, is engaged with the internal threads of the bushing as shown more clearly in Figures 5, 13 and 14.

The front end of the bushing —57— is preferably enlarged to form a head between which and the adjacent face of the saddle —55— is interposed a clamping plate —59— having an aperture for receiving said bushing so that when the latter is tightened it will also tighten the clamping plate —57— firmly against the adjacent face of the saddle, said plate and saddle being also provided with registering apertures for receiving additional clamping bolts —60— arranged at opposite sides of the bushing —57— to hold the plate —59— against turning about the axis of the bushing.

The clamping plate —59— is provided with a pair of bolt holes just below the lower edge of the central portion of the saddle —55— for receiving a pair of bolts —61— which extend transversely across the underside of the central portion of the saddle —55— and are provided with enlarged swivel heads —62— adapted to engage in corresponding sockets in another clamping plate —63— which is normally parallel with the plate —59— but arranged at the rear of the central portion of the saddle —55— in spaced relation thereto so that the lower ends of both plates will be disposed in about the same horizontal plane but in transversely spaced relation for receiving between them the central hub —64— of a lens supporting plate —65—, as shown more clearly in Figures 5 and 13.

The hub —64— of the plate —65— is, therefore, interposed between the lower edges of the clamping plates —59— and —63—, the latter being extended upwardly across the rear end of the screw —58— so that when the latter is tightened it will rock the plate —63— about the heads of the screws —61— for firmly clamping the hub —64— of the lens holder between the lower edges of both plates.

On the other hand, if the screw —58— is loosened, it releases the clamping plate —63— and allows the lens holding plate —65— with the lens thereon to be withdrawn from between the plates, thus permitting the removal of the finished lens and replacement of another lens to be ground.

The frame sections —43— and —44— constitute what may be termed a semi-floating frame or carrier for the lens holder —56— in that it is relatively long from front to rear and is pivotally supported at its rear end while its front end is free to swing vertically and laterally for imparting a compound traversing movement of the lens across and upon the surface of the lap to conform to the contour of said surface.

In addition to the vertical and lateral rocking movement of the frame sections —43— and —44—, it will be observed that the front frame section —44— carrying the lens holder —56— is free to rock vertically about the horizontal axis of the shaft —45— or at right angles to the axes of the shaft —29— and spherical bearings —42— and —42'— to conform to the transverse curvature along the longer axis of the grinding surface of the lap, it being understood that the saddle —55— carrying the lens holder —56— is free to rock forwardly and rearwardly about the fulcrum points of the pins —53— on their respective bearings —54— to enable the position of the lens to conform to the curvature of the lap along the shorter axis thereof thereby facilitating the semi-floating traversing movements of the lens holder on the grinding surface of the lap without special adjustment on the part of the operator.

Pressure means

The lens is yieldingly held against the surface of the lap partially by the weight of the front end of the semi-floating frame sections —43— and —44— and saddle —55— and partly by means of an upright pressure rod —66— and a coil spring —67— surrounding the rod, said rod having its lower end pointed and engaged with a hardened bearing —68— on the front end of the pivotal spindle —45— as shown more clearly in Figures 3, 5, 10 and 11.

Figure 3:
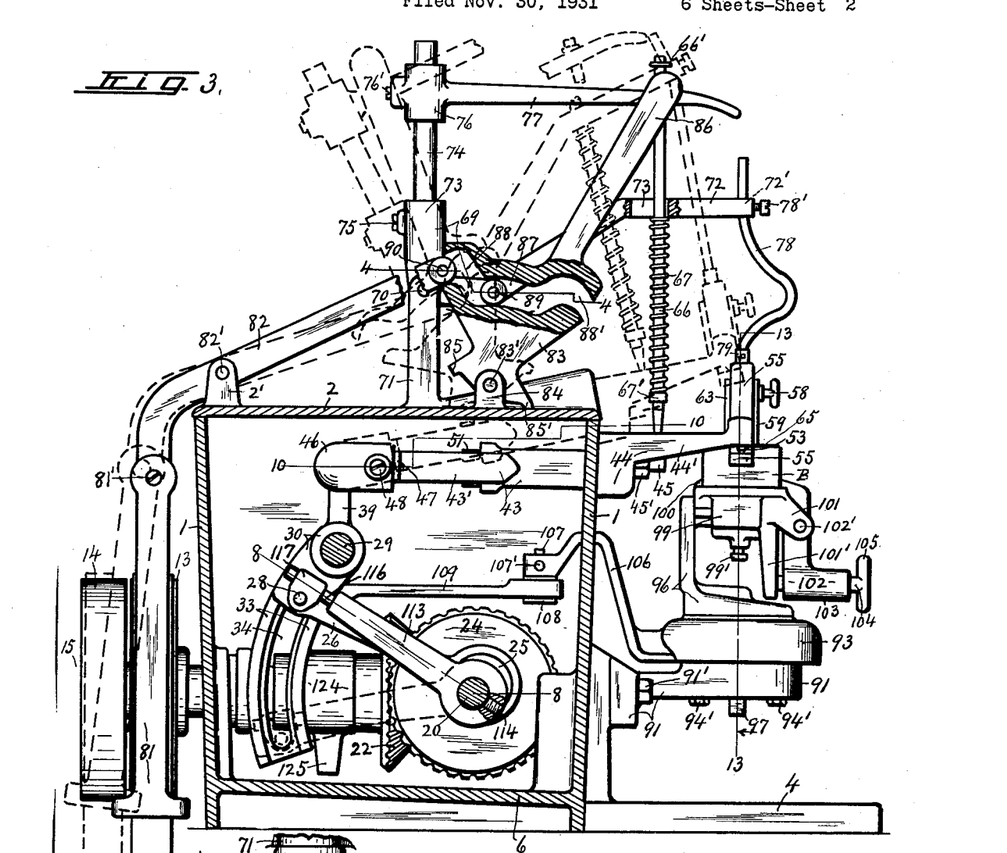
Figure 3 is a vertical sectional view taken in the plane of line 3—3, Figure 2, the right hand end of the machine being shown in elevation partly broken away while the belt shifting and carrier lifting mechanism is shown partly in section and partly in elevation and indicated by dotted lines in the position for shifting the belt to the loose pulleys and for lifting the work supporting carrier away from the lap.
Figure 4:
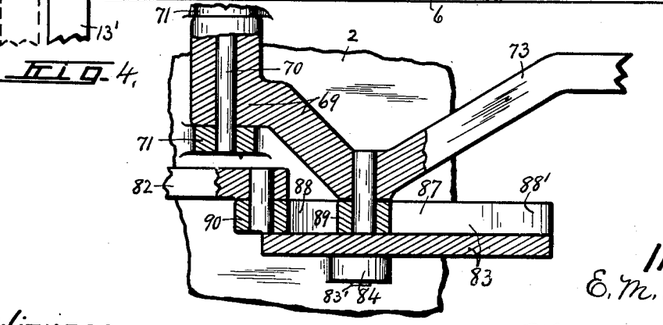
Figure 4 is an enlarged horizontal detail sectional view taken along line 4—4, Figure 3.

A bell crank lever —69— is pivoted at —70— to and between a pair of upright posts —71— on the top —2— of the housing —1— as shown more clearly in Figures 3 and 4 and is provided with a forwardly extending arm —72— having an elongated slot —73— through which the pressure bar —66— extends, the other arm —73— of the bell crank lever being extended upwardly from the pivot —70— and provided with a vertically elongated socket for receiving a vertically adjustable post —74— which is held in its adjusted position by set screw —75—, as shown more clearly in Figure 3.

A hub —76— is adjustable vertically along the post —74— and is secured in its adjusted position by means of a set screw —76'—.

The hub —76— is provided with a forwardly projecting handle arm —77— some distance above the arm —72— of the bell crank lever —69— as shown more clearly in Figures 1 and 3, said arm being provided with a vertical opening alined with the slot —73— in the bell crank arm —72— for receiving the upper end of the pressure rod —66—, the latter being provided at its upper end with a shoulder —66'— adapted to be engaged by the upper face of the arm —77— when the latter is rocked upwardly and rearwardly in a manner presently described.

The coil spring —67— around the pressure rod —66— is interposed between the lower face of the arm —72— of the bell crank lever —69— and a shoulder —67'— on the lower end of the pressure rod and is normally held under compression by the arm —72— to cause the pressure rod —66— to exert downward pressure on the bearing —68— for yieldingly holding the lens —a— in contact with the surface of the lap —B— and more effectively grinding the lens as the latter is moved across the surface of the lap, see Figures 3, 5 and 13.

The arm —72— of the bell crank lever —69— is extended forwardly beyond the pressure rod —66— to a point directly over the center of the lens holder and is provided with a vertical opening —72'— for receiving the upper end of a flexible strap —78— which is secured in said opening by set screws —78'— and has its lower end provided with a coupling member —79— secured by a set screw —80— in a socket in the upper central portion of the saddle —55—, as shown more clearly in Figures 1, 2, 3, 5 and 13.

Carrier lifting and belt shifting means

The pulleys —13— and —14— may be connected to any available source of power by means of a belt —13'— which is shiftable from the loose pulley —14— to the tight pulley —13— and vice versa for starting and stopping the machine and for this purpose is provided a belt shifting arm —81— having its lower end forked and adapted to engage opposite edges of the belt and its upper end secured by a clamping bolt —81'— to one end of a lever —82— which is pivotally fulcrumed intermediate its ends at —82'— to and between a pair of upright posts —82'— on the top —2— of the housing —1— as shown more clearly in Figures 1 and 3.

The adjacent ends of the belt shifting members —81— and —82— are arranged in overlapping relation and are relatively adjustable about the axis of the clamping bolt —81'—, the meeting faces of the overlapping portions being provided with conventional serrations to assist in holding the members —81— and —82— in fixed relation when the clamping bolt —81'— is tightened.

A cam plate —83— is pivoted at —83'— to a post —84— on the top plate —2— of the housing —1— to rock forwardly and rearwardly and has its lower end provided with stops —85— and —85'— for alternately engaging the upper surface of the plate —2— and thereby limiting the swinging movement of the cam plate —83— in opposite directions, see Figure 3.

The upper end of the cam plate —83— is provided with a handle —86— extending upwardly therefrom by which the cam plate may be rocked about its axis.

The intermediate portion of the cam plate is provided with a forwardly and rearwardly extending groove having its opposite walls of its central portion —87— concentric with the axis of the pivot —83'— and the opposite walls of its opposite ends —88— and —88'— divergent upwardly and outwardly.

The rear portion of the arm —72— and front end of the lever —82— are provided respectively with rollers —89— and —90— projecting into the groove or slot of the cam plate —83—, one in front of the other, a distance apart approximately equal to one half the length of the groove or slot from front to rear so that when the roller —89— is engaged with the concentric walls of the central portion —87— of the slot the other roller —90— will be engaged with the opposite walls of the rear end —88— of the slot as shown by full lines in Figures 3 and 4.

On the other hand, when the cam plate is rocked rearwardly by its handle —86— the roller —89— will be brought into engagement with the opposite walls of the front end —88'— of the slot and at the same time the roller —90— on the front end of the lever —82— will be brought into engagement with the opposite walls of the central concentric portion —87— of the slot.

When the cam plate —83— is rocked forwardly to the position shown by full lines in Figure 3, the roller —89— will be brought into engagement with the opposite walls of the central concentric portion of the slot and thereby cause the bell crank lever —69— to be rocked forwardly and downwardly to allow the carrier frame for the lens holder to rock in the same direction to bring the lens into contact with the surface of the lap thereby slackening the strap —78— and at the same time causing the arm —72— to engage and compress the spring —67— for exerting pressure of the lens upon the lap while at the same time the arm —77— will be moved in a corresponding direction along the upper end of the pressure rod —66— away from the shoulder —66'— to allow the spring —67— to exert its full pressure upon the front end of the carrier for the lens holder in the manner previously described, as shown by full lines in Figure 3.

As the cam plate —83— is rocked forwardly by its handle —86—, the roller —90— on the front end of the lever —82— will ride up the inclined cam portion —88— of the slot, thereby elevating the adjacent end of said lever and causing the shifting member —81— to move forwardly for shifting the belt from the loose pulley —14— onto the tight pulley —13— for starting the machine simultaneously with the lowering of the lens holder toward the lap.

On the other hand, when the cam plate —83— is rocked rearwardly from the position shown by full lines to the position shown by dotted lines in Figure 3, the roller —89— will be caused to ride up the inclined portion —88'— of the cam slot for rocking the bell crank lever —69— upwardly and rearwardly, thereby raising the arm —72— and incidentally straightening the strap —78— for raising the front end of the lens holder carrier for moving the lens upwardly out of contact with the surface of the lap to the position shown by dotted lines in Figure 3.

This rearward rocking movement of the bell crank —69— causes the arm —77— to engage the shoulder —66'— on the upper end of the pressure rod —66— for raising said rod simultaneously with the lifting of the lens holder away from the lap, it being understood that the lost motion between the front end of the arm —77— and shoulder —66'— will be initially substantially equal to the lost motion of the arm —72— of the bell crank lever —69— before the strap —78— is straightened thereby assuring sufficient tension of the spring —67— between the arm —72— and shoulder —67'— on the pressure rod —66— to hold the lower end of the pressure rod in engagement with its hardened bearing —68— on the front end of the spindle —45—.

Simultaneous with this lifting of the front end of the lens holder from the lap, the roller —90— will ride down the rear inclined portion —88— of the cam slot in the cam plate —83— thereby rocking the front end of the lever —82— downwardly and incidentally rocking the belt shifting lever —81— rearwardly for shifting the belt —13'— from the tight pulley onto the loose pulley for stopping the operation of the machine.

It is now clear that when the cam plate is rocked forwardly the lens holder will be brought into engagement with the surface of the lap and at the same time the belt —13'— will be shifted from the loose pulley on to the tight pulley for starting the operation of the machine and that the rearward movement of the cam plate will effect the simultaneous lifting of the lens holder away from the surface of the lap and shifting the belt from the tight pulley on to the loose pulley, thus stopping the operating means for the lens holder.

*Lap supporting means*

A bracket —91— is secured by bolts —91'— to the front face of the housing —1— to extend forwardly therefrom in a plane between and in vertically spaced relation to the shelf —4— and lens holder —56— and is provided with an anti-friction bearing —92— arranged about a vertical axis substantially co-incident with the center of the lens holder when the latter is in its intermediate position, shown more clearly in Figures 1 and 2 for receiving and supporting an oscillatory member —93— which is movable angularly about said axis, the anti-friction members being held in place by a retaining ring —94— which, in turn, is held in place by bolts —94'— passing from the underside upwardly through adjacent portions of the bracket —91— and engaged in threaded apertures in the retainer ring as shown more clearly in Figure 5.

The ball bearings —92— project slightly beyond the periphery of the adjacent portion of the bracket —1— and retainer ring —94— and enter an inner annular groove —95— in the member —93— to hold said member against vertical displacement while permitting its free angular movement about the axis of the ball bearing.

An additional bracket —96— is mounted upon the upper face of the angularly movable member 93 to extend upwardly therefrom and is secured to said member by means of a thumb screw —97— for angular movement therewith, Figures 5 and 13.

The upper end of the bracket —96— is provided with horizontal guide pins —98— and —98'— projecting forwardly therefrom at opposite sides of the vertical axis of the rotary member —93— for receiving a lap supporting member —99— which is adjustable forwardly and rearwardly along the guide pins —98— and —98'— and is held in its adjusted position by a set screw —99'— engaging one of the pins, as —98—, shown more clearly in Figure 13, thus permitting the lap to be properly adjusted relatively to the lens holder.

The lap —B— rests upon the upper face of the member —99— and against a clamping shoulder —100— on the rear end of said member, the front end of which latter is provided with pendant lugs —101— and —101'—, said lug —101'— being extended downwardly some distance beyond the lug —101— for a purpose presently described.

A movable clamping member —102— is pivoted intermediate its ends at —102'— to the lug —101— to extend upwardly therefrom partially across the front end face of the lap —B— for holding said lap upon the upper face of the member —99— and against the rear shoulder —100—, said movable clamping member being extended downwardly along the front face of the lug —101'— and is provided with a threaded socket —103— for receiving an adjusting screw —104— having a handle —105— by which it may be rotated for engaging the front face of the lug —101'— and thereby rocking the member —102— about its pivot —102'— for tightening and releasing the upper end of said clamping member to and from clamping engagement with the front face of the lap —B— as shown more clearly in Figures 3 and 5.

*Lap turning means*

Owing to the differential speeds of rotation of the gears —24— and —24'— and their corresponding eccentrics —25— and —25'—, it is evident that the eccentrics will assume similar angular positions at regularly receiving periods of their revolutions at which time the crank arms —39— and —39'— will also be caused to assume similar angular relation thereby causing the carrier 43—44 and its lens holder —56— to be reciprocated forwardly and rearwardly along and around one of the meridians as —x—, Figure 11 and that, as the rotation of the eccentrics continues, the angular relation of the eccentrics and also the angular relation of the crank arms —39— and —39'— will gradually change.

This gradual change in the angular relation of the crank arms —39— and —39'— causes the carriers 43—44 and its lens holder to be reciprocated endwise with gradually reducing strokes and also to be oscillated laterally through gradually increasing strokes until the eccentrics —25— and —25'— and the corresponding crank-arms —39— and —39'— assume their extreme opposite angles at which time the carrier 43—44 and lens holder —56— will be reciprocated laterally along and around another meridian as —y—, Figure 10.

Then, as the rotation of the eccentrics continues they, together with the corresponding crank arms —39— and —39'—, will gradually return to their similar angular relation thereby causing the carrier 43—44 and lens-holder to be oscillated laterally through gradually reducing strokes and to be reciprocated endwise with gradually increasing strokes until the eccentrics return to their similar angular relation, thus completing one cycle of operation which is repeated as often as may be necessary to complete the grinding of the lens.

These compound movements are continually changing, due to the differential speed rotation of the eccentrics, and cause the lens holder to travel in continuously changing elliptical paths of constantly changing diameters with the result that the area of the lap traversed by the lens holder is somewhat diamond shape in outline.

It will also be noted that the lateral oscillatory motion of the carrier causes the lens holder —56— to move through the arc of a circle having its center in a medial line between the bearings —42— and —42'— or between the radial lines $m$—$m'$— Figure 10, and in order to maintain proper grinding relation between the lens and lap during the movement of the lens through said arc, suitable means is provided for effecting a gradual angular movement of the lap so that its meridians may be maintained substantially parallel with the corresponding meridians —$x$— and —$y$— of the lens.

For this latter purpose, the supporting member —93— for the lap carrier is rotatably mounted upon the bracket —91— and is provided with an upwardly and rearwardly extending crank arm —106— having its rear end provided with a vertically disposed pivotal pin —107— which is secured thereto by set screw —107'— and has its lower end tapered upwardly for receiving and supporting a cross head —108—, as shown more clearly in Figures 1, 2, 3, 5 and 12, the crank arm —106— and carrier for the lens holder being movable in an opening —1'— in the upper portion of the front wall of the housing —1— as shown more clearly in Figures 2 and 5 above the oil level in the housing.

Figure 12:
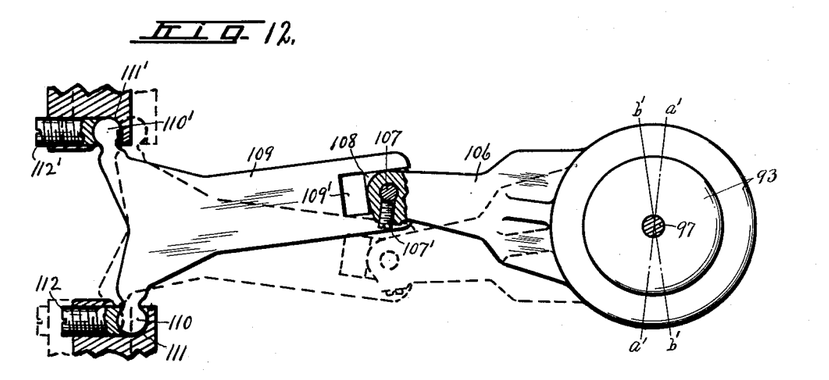
Figure 12 is a detail horizontal sectional view taken on line 12—12, Figure 5.

Lateral oscillatory motion is transmitted from the rocking members —30— and —30'— respectively to the crank arm —106— through the medium of an oscillating arm —109— having its front end provided with a slot —109'— for receiving the cross head —108—, the rear end of the arm —109— being provided with oppositely projecting spherical bearings —110 and —110'— engaging in corresponding sockets —111— and —111'— in the rocking members —30— and —30'— respectively in a plane below the cross shaft —29—, as shown more clearly in Figures 3, 5, 6 and 12, the spherical bearing members —110— and —110'— being held in their respective sockets by adjusting screws —112— and —112'— as shown in Figure 12.

It will be noted upon reference to Figures 3, 6 and 9, that the distance of the bearing members —110— and —110'— below the axis of the cross shaft —29— is somewhat less than the distance between said axis and the bearing members —42— and —42'— for the rear end of the carrier frame for the lens holder and it, therefore, follows that the arms —109— and carrier frame for the lens holder will be oscillated simultaneously in opposite directions and that the range of oscillation of the front end of the arm —109— will be somewhat less than that of the front end of the carrier frame for the lens holder, this reduced range of oscillation of the arm —109— being utilized for effecting the desired angular movement of the lap —B— through the medium of the crank arm —106— and lap supporting member —93—.

That is, the arm —109— and carrier 43—44 will be oscillated simultaneously in opposite directions but owing to the fact that the front end of the arm —109— is connected to the rear end of the crank arm —106— of the angularly movable lap support —93—, the direction of angular movement of the latter and also the lap carried thereby will be reversed to cause corresponding meridians of the lap and lens to maintain substantially parallel relation.

It will now be understood that the connections between the oscillating members —30— and —30'— and lap supporting member —93— and the connections between the same oscillating members —30— and —30'— and lens holder are arranged in such relation that when the carrier frame for the lens holder is rocked laterally through and to opposite sides of a medial line as indicated by full lines and by dotted lines in Figure 10 to cause the lens holder to travel along and around the meridian —$y$—, Figure 10, the lap —B— will be simultaneously rocked about the axis of its supporting member —93— through similar angles across and to opposite sides of a medial line as shown by full lines and dotted lines in Figure 12.

For example, when the carrier for the lens holder is rocked to the position shown by full lines in Figure 10, the meridian —$y$— will assume the position of line $a$—$a$ in the same figure at which time the corresponding meridian of the lap will assume a position along the line $a'$—$a'$—, Figure 12.

In like manner, when the supporting frame for the lens holder is moved to the position shown by dotted lines in Figure 10, the meridian —$y$— of the lens will assume a position along line $b$—$b$ in the same figure and at the same time the corresponding meridian of the lap will assume a position along the line $b'$—$b'$—, Figure 12, this parallel relation between the longer meridian of the lens and corresponding meridian of the lap being maintained in all angular positions of the carrier for the lens holder.

It is to be understood, however, that, even though the arm —109— has a compound reciprocatory motion endwise and laterally, the arm —106— and its lap-supporting member —93— will be oscillated laterally only about the fixed axis of the member —93— by reason of the lost motion connection between the arms —106— and —109—.

Carrier stroke adjusting means

In machines of this character, it is desirable to provide means whereby the forward and rearward stroke as well as the lateral stroke of the lens holder may be varied according to the area of the surface to be ground or according to the area of the grinding surface without interrupting the grinding operation and for this purpose a pair of crank arms —113— and —113'— are secured by set screws —114— to the cross shaft —20— closely adjacent the outer faces of the pitmen —26— and —26'— respectively, the rear ends of said crank arms being provided with radial sockets —115— and —115'— for receiving the front ends of a pair of rods —116— and —116'— as shown more clearly in Figure 8, said rods being tightly fitted in their respective sockets to form extensions of their corresponding crank arms —113— and —113'—.

These extension rods —116— and —116'— extend rearwardly through corresponding openings in adjacent yoke members —117— and —117'— which, in turn, are pivotally mounted upon the outer ends of the adjacent yoke pins —28— and —28'— and are slidable along and upon their respective extensions —116— and —116'— as the crank arms —33— and —33'— are rocked forwardly and rearwardly as shown more clearly in Figures 2, 3 and 8.

A hand lever —118— is secured by set screw —119— to one end of the shaft —20— to normally extend upwardly therefrom and serves as a means by which the shaft —20— and its crank arms —113— and —113'— may be moved angularly about the axis of said shaft for moving the rear ends of the pitmen —26— and —26'— and their respective cross heads —35— and —35'— along their respective slots —34— and —34'— toward and from the axis of the shaft —29—, see Figures 1, 2, 7, 8 and 9.

It will be remembered that the gears —24— and —24'— and their respective eccentric hubs —25— and —25'— are loosely mounted upon the shaft —20— to permit the latter to be moved angularly about its axis irrespective of the relative rotation of said gears, thus leaving the shaft —20— free to be rocked about its axis by means of the hand lever —118— for effecting a corresponding angular movement of the crank arms —113— and —113'— and their respective yokes —35— and —35'— along the slots —34— and —34'— of the adjacent crank arms —33— and —33'— which, in turn, are loosely mounted upon the cross shaft —29—.

Owing to the fact that the throw of the eccentric members —25— and —25'— is constant and that the reciprocal movements of the pitmen —26— and —26'— are also constant, it is evident that the adjustments of the rear ends of the pitmen and their yokes —35— and —35'— along the slots —34— and —34'— toward and from the axis of the shaft —29— will cause a corresponding difference in throw of the crank arms —39— and —39'—, the effect of which is to change the stroke of the carrier —43—44— and lens holder —56— carried thereby.

For example, if the hand lever —118— is operated in one direction to move the crank arms —26— and —26'— and their respective yokes —35— and —35'— to their extreme upper positions as shown by full lines in Figures 3 and 9, the crank arms —33— and —33'— and also the crank arms —39— and —39'— will reach their maximum throw or stroke, thereby causing a maximum stroke of the support for the lens holder together with the lens holder forwardly and rearwardly and also laterally.

On the other hand, if the hand lever —118— is moved in an opposite direction, the crank arms —26— and —26'— together with their respective yokes —35— and —35'—, will be moved downwardly toward the position shown by dotted lines in Figure 9, the effect of which would be to reduce the angular movement of the rocking members —30— and —30'— and their respective crank arms —39— and —39'— resulting in a corresponding reduction of the forward and rearward and lateral strokes of the carrier for the lens holder, it being evident from the foregoing description that by operating the hand lever —118— to any intermediate position, it will cause a corresponding change in the stroke of the carrier for the lens holder.

It will be noted that these shifting movements of the rear ends of the pitmen —26— and —26'— along their corresponding crank arms —33— and —33'— and resultant change in the forward and rearward and lateral stroke of the lens holder carrier may be effected without in any way interrupting the grinding operation of the machine.

Lubricating system

The oil level within the housing —1— is preferably above the gears —24— and —24'— and in order that all of the moving parts within the housing may be properly lubricated, I have provided an oil pump —120— comprising a pair of intermeshing gears —121— and —122—, one of which as —121— is secured by a pin —121'— to the driving shaft —12—, the other gear being mounted upon a relatively short shaft —123— which is journaled in the pump housing —124— as shown more clearly in Figures 5 and 6.

The housing is provided with a downwardly extending inlet —125— and an upwardly extending outlet —126—, the latter being connected by an upwardly extending pipe —127— to a perforated distributing head —128— which preferably overlies the upper ends of the arms —39— and —39'—.

This pump is arranged to draw the oil from the lower portion of the interior of the housing —1— upwardly through the inlet —125— and then to force it upwardly through the outlet —126—, pipe —127— and distributing head —128— for distributing the oil upon the underlying moving parts and allowing it to fall back into the reservoir.

Operation

Assuming that the hand lever —86— and parts operated thereby are in their neutral positions as shown by dotted lines in Figure 3 and that the lap —B— and lens-holder —56— with the lens thereon have been clamped to their respective supports —99— and —55— in the manner previously described, then as the hand-lever —86— and parts operated thereby are moved to the position shown by full lines in Figures 1, 2, 3 and 5, the belt —13'— will be shifted onto the tight pulley —13— and at the same time the lens holder —56— will be brought into grinding relation with the lap —B— and will be yieldingly held in this relation by the action of the spring —67— acting upon the pressure rod —66— and aided by the pressure of the arm —72— upon the upper end of the spring as previously explained.

During this operation the roller —89— on the bell crank lever —69— will be brought into engagement with the opposite walls of the concentric slot —87— of the cam plate —83— to hold said lever against vibratory movement about its pivot —70— while the roller —90— will be engaged with the opposite walls of the cam slot —88— to hold the belt shifting lever in its shifted position.

The machine now being in operation and the eccentrics —25— and —25'— rotating at slightly different speeds, it is evident that at regularly recurring intervals they will be in step or in similar angular relation which will gradually change until at other regularly recurring intervals they will be out of step or in opposed angular relation, gradually returning again into step relation.

These relative rotary motions are utilized for reciprocating the corresponding pitmen —26— and —26'— which, in turn, oscillate the corresponding rocking members —30— and —30'— about the axis of their supporting shaft —29—, thereby causing the crank arms —39— and —39'— to assume similar angular relation when the eccentrics are in step and also to assume opposed angular relation when the eccentrics are angularly opposed, the angular relation of the crank arms —39— and —39'— being gradually changed from their similar relation to their opposed relation and vice versa.

This gradual changing of the angular relation of the crank arms —39— is transmitted to the carrier 43—44 and thence to the lens holder so that when the eccentrics —25— and —25'— are in step and the crank arms —39— and —39'— are in similar angular relation, the carrier and lens holder will be reciprocated endwise or forwardly and rearwardly a distance corresponding to the throw of the upper ends of the crank arms —39— and —39'—, which throw is dependent upon the position of the rear ends of the pitmen —26— and —26'— along the lower crank arms —33— and —33', and is indicated by the line —x—, Figure 11.

Owing to the gradual change in the relative angular positions of the crank arms —39— and —39'—, it is evident that the carrier and lens holder will be gradually oscillated laterally through gradually increasing arcs and at the same time the range of endwise reciprocatory movement will be gradually reduced until the eccentrics —25— and —25'— and crank arms —39— and —39' assume opposed angular relation at which time the carrier —43—44— for the lens holder will have reached its maximum arc of movement along and around another meridian as —y—, Figure 10 at right angles to the first meridian as —x—, Figure 11.

During this lateral oscillating movement of the lens holder carrier from its minimum to its maximum range of lateral oscillation along and around the meridian —y—, the range of endwise reciprocatory movements of the same elements will be gradually reduced until the carrier and lens holder reach their maximum range of oscillation at which time the forward and rearward endwise movement will be practically nil.

Under these conditions, the lens holder will be moved across the surface of the lap in continually changing elliptical paths, gradually increasing in diameter along the meridian —y—.

Then, as the eccentrics —25— and —25'— and crank arms —39— and —39'— continue their respective rotations and oscillation, the carrier 43—44— and lens holder —B— will be returned along and around the meridian —y— through continually changing elliptical paths which will gradually diminish in length along said meridian while maintaining a gradually increasing endwise movement along and around the meridian —x—, Figure 11, thus completing one cycle of operation which is repeated until the lens is ground to the desired contour.

While the lens holder is being moved through its arc of movement along the meridian —y—, the lap supporting member —93— will be gradually turned to different angles about its axis to keep its corresponding meridian approximately parallel with that of the lens, this operation being accomplished through the medium of the oscillating member —109— and its connections with the bearings —110— and —110'— on the crank arms —33'— and —34'— respectively, the front end of the member —109— being connected with a lost motion to the rear end of the arm —106— of the lap supporting member —93— to allow said member —109— to move endwise in addition to its oscillating motion without transmitting such endwise movement to the lap supporting member —93—.

If it should be desired to change the endwise and lateral strokes of the carrier 43—44, it is simply necessary to rock the hand lever —118— and rock shaft —20— in a direction which will cause the arms —113— and —113'— to shift the rear ends of the pitmen —26— and —26'— along their respective crank arms —33— and —33'— which may be accomplished without interrupting the operation of the machine.

When the grinding operation is completed, the hand lever —86— may be rocked rearwardly from the position shown by full lines in Figure 3 to the position shown by dotted lines, thereby effecting a similar rocking movement of the cam plate —83— for rocking the bell crank lever —69— upwardly and rearwardly, and thereby lifting the front end of the carrier 43—44— and lens holder —56— out of engagement with the lap —B— and at the same time operating the belt shifting lever —82— to shift the belt from the tight pulley —13— onto the loose pulley —14— for stopping the further operation of the machine.

When the operation of the machine is stopped in the manner just described and the lens holder is lifted out of engagement with the lap, the lens may be removed and replaced by another one to be ground.

The remaining operations are clearly obvious from the earlier description and while the machine shown and described is particularly simple in construction and highly efficient in operation, various changes may be made therein without departing from the spirit of the invention, it being understood that the entire operation of the machine is controlled by a single hand lever, as —86—, and that the endwise and lateral strokes of the lens supporting carrier may be controlled entirely by the hand lever —118—.

What I claim is:

1. In a surface grinding machine, a grinding element, a work-supporting element, and means for reciprocating one of the elements in continually changing paths along and around different meridians of the work, said means including a pair of coaxial rotary eccentrics, and connections between said eccentrics and the element to be reciprocated.

2. In a surface grinding machine, a grinding element, a work-supporting element, and means for reciprocating one of the elements in continually changing elliptical paths along and around different meridians at right angles to each other, said means including a pair of coaxial rocker arms operatively connected to the element to be reciprocated.

3. In a surface grinding machine, a grinding element, a work-supporting element, and means for reciprocating one of the elements in continually changing paths relatively to the other element, and including a pair of coaxial rocker arms relatively movable about their axis, and a carrier pivotally connected to both of said rocker arms.

4. In a surface grinding machine, a grinding element, a work-supporting element, means for reciprocating one of the elements in continuously changing paths along and around different meridians of the work, and means operable at will for varying the stroke of the reciprocating element without interrupting its movement.

5. In a surface grinding machine, a grinding element, a work-supporting element, means for reciprocating one of the elements in continuously changing paths along and around different meridians of the work, means operable at will for moving one of the elements out of engagement with the other element, and means actuated by the last named means for stopping the operation of the reciprocating means.

6. In a surface grinding machine, a grinding element, a work-supporting element and means for reciprocating the work-supporting element in continuously changing elliptical paths along and around different meridians of the grinding element, said means including a pair of coaxial rocker arms relatively movable about their axis, and a carrier for one of the elements pivotally connected to both of said arms.

7. In a surface grinding machine, a grinding element, a work-supporting element, a pair of rotary eccentrics, means for rotating the eccentrics at different rates of speed and means actuated by said eccentrics for reciprocating one of said elements in continuously changing paths along and around different meridians intersecting each other at right angles.

8. In a surface grinding machine, a grinding element, a work-supporting element, a pair of rocker-arms relatively movable about a common axis in axially spaced relation, a carrier for one of said elements hingedly connected to said rocker-arms, and means for simultaneously rocking said arms through relatively changing angles for effecting a compound endwise and lateral rocking movement of the carrier.

9. A surface grinding machine as in claim 8 in which the carrier is composed of sections journaled one upon the other for relative rocking movement about an axis extending transversely of the axis of the rocker-arms.

10. A surface grinding machine as in claim 8 in which means is provided for turning the other element to different angles to keep corresponding meridians in substantially parallel relation.

11. In a surface grinding machine, a lap, a lens-holder, means including coaxial rotary eccentrics for moving the lens holder through different meridians across the surface of the lap, and means actuated by a part of the first-named means for adjusting the lap angularly in its plane of support for keeping one of its meridians substantially parallel with the corresponding meridians of the lens in all angular positions of the lens-holder.

12. In a surface grinding machine, a grinding element, a work-supporting element, a pair of rotary eccentrics, means for rotating the eccentrics at different rates of speed, a pair of rocker-arms relatively movable about a common axis in axially spaced relation, means for transmitting motion from the eccentrics to their respective rocker-arms, and a carrier for the work-supporting element pivotally mounted on said rocker-arms.

13. In a surface grinding machine, a lap, a lens-holder, a support for the lens-holder having bearings at opposite sides thereof in about the plane of the lens surface to be ground, a carrier having portions thereof overlying said bearings and provided with pointed members having end thrust engagement with the upper faces of the bearings toward the lap, and means for reciprocating the carrier endwise and laterally.

14. In a surface grinding machine, a grinding element, a work-supporting element, a pair of rocker-arms movable about a common axis in axially spaced co-axial relation, means for oscillating said arms relatively to each other through equal arcs but at gradually changing time periods whereby at certain intervals they will be in similar angular relation and at other intervals in opposed angular relation, and means for transmitting motion from both crank-arms to one of said elements.

15. In a surface grinding machine, a grinding element, a work-supporting element, a pair of rocker-arms movable about a common axis in axially spaced co-axial relation, means for oscillating said arms relatively to each other through equal arcs but at gradually changing time periods whereby at certain intervals they will be in similar angular relation and at other intervals in opposed angular relation, and means for transmitting motion from both crank-arms to one of said elements, and means operable at will for varying the throw of the crank-arms without interrupting the grinding operation.

16. In a surface grinding machine, a lap, a lens-holder in grinding relation to the lap, means for moving the lens-holder in continuously changing elliptical paths along and around different meridians of the lap at right angles to each other, and means synchronized with the movements of the first-means for adjusting the lap angularly in its plane of support for keeping its meridians substantially parallel with the corresponding meridians of the lens.

17. In a surface grinding machine, a lap, a lens-holder in grinding relation to the lap, and power-driven means for reciprocating the lens holder in continuously changing elliptical paths along and around different meridians of the lap, and power-driven means for oscillating the lap about a vertical axis during the grinding operation.

18. In a surface grinding machine, a lap, a lens-holder in grinding relation to the lap, and power-driven means for reciprocating the lens holder in continuously changing elliptical paths along and around different meridians of the lap, and means operable at will for varying the stroke of the reciprocating means without interrupting the grinding operation.

19. In a surface grinding machine, a lap reciprocally movable about a vertical axis, a work holder movable across the surface of the lap, a pair of coaxial rotary eccentrics, means for rotating the eccentrics at different rates of speed, a pair of coaxial rocker arms movable about an axis parallel with the axis of rotation of the eccentrics, means for transmitting motion from the eccentrics to their respective rocker arms, means for transmitting motion from the rocker arms to the work holder, and means for transmitting motion from the rocker arms to the lap.

20. In a surface grinding machine, a lap reciprocally movable about a vertical axis, a work holder movable across the surface of the lap, a pair of coaxial rotary eccentrics, means for rotating the eccentrics at different rates of speed, a pair of coaxial rocker arms movable about an axis parallel with the axis of rotation of the eccentrics, pitman connections between the eccentrics and their respective rocker arms for rocking said arms, means for adjusting the pitmen to different positions along said arms for varying the arcs of movement thereof, means for transmitting motion from the rocker arms to the work holder, and means for transmitting motion from said rocker arms to the lap.

ELI MAYNARD LONG.